United States Patent Office 3,256,241
Patented June 14, 1966

3,256,241
GLYCOL 1,4-BICYCLO[2.2.2]OCTANEDICARBOXYLATE POLYESTERS
William H. Watson, Grifton, N.C., assignor to E. I. du Pont de Nemours and Company, Wilmington, Del., a corporation of Delaware
No Drawing. Filed Nov. 7, 1962, Ser. No. 236,157
7 Claims. (Cl. 260—47)

This invention relates to novel polyesters which are photostable and, although derived from a saturated dicarboxylate acid, are additionally characterized by high melting points, crystallizability, and other physical properties normally associated in the polyester field only with those polymers derived from certain aromatic meta- or para-dicarboxylic acids.

It has been found previously that polyesters of saturated dicarboxylic acids, as well as polyesters of many aromatic dicarboxylic acids such as the ortho-phthalate polyesters, are generally characterized by low melting points and very low softening points. Some of the polyesters are actually liquid at room temperature, while many others melt or at least soften below the boiling point of water. It has been found that high melting, crystallizable polyesters can be prepared by reacting certain aromatic meta- or para-dicarboxylic acids with glycols or with dihydric phenols. Hitherto, the polyesters selected for commercial evaluation in the form of fibers, films, and molded articles have generally been polyesters derived from such aromatic dicarboxylic acids owing to their crystalline, high melting nature. However, certain disadvantages have also been associated with the polyesters derived from the aromatic dicarboxylic acids. In particular, many such polyesters have been found to have relatively low stability when exposed to light, so that upon exposure to sunlight or other strong light the polyesters become discolored and lose strength.

In accordance with the present invention, polyesters are prepared by reacting 1,4-bicyclo[2.2.2]octanedicarboxylic acid,

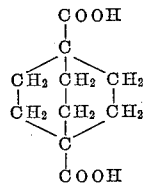

or an ester-forming derivative thereof, with a dihydroxy compound or an ester-forming derivative thereof. The dihydroxy compound may be either a glycol or a dihydric phenol. The polyester products are generally characterized by good stability to light, both outdoors and indoors, and are useful in the preparation of molded articles and for producing tenacious films and fibers. Many of the novel polyester fibers are characterized by highly superior performance in "wash-and-wear" garments.

The preparation of 1,4-bicyclo[2.2.2]octanedicarboxylic acid has been described by Roberts, Moreland, and Frazer in J. Am. Chem. Soc. 75, 637 (1953).

The novel linear polyesters of the invention may be illustrated as possessing recurring units of the following structural formula:

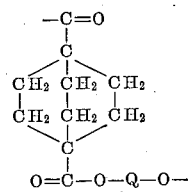

in which Q is a divalent organic radical containing from 2 to about 20 carbon atoms. Thus, Q may be an arylene, aralkylene or alkylene (including cycloalkylene) radical of 2 to about 20 carbon atoms derived from a glycol or a dihydric phenol of the formula $Q(OH)_2$. Ester-forming derivatives of the dihydroxy compound, i.e., compounds containing functional groups equivalent to the hydroxyl group in their ability to react with the carboxyl group, such as epoxides or esters of the dihydroxy compound, may also be used. Particularly useful are the acetate ester or esters of other aliphatic acids having relatively few carbon atoms.

Suitable dihydroxy compounds which may be employed include

Ethylene glycol,
Propylene glycol,
Butylene glycol,
2,2-dimethylpropylene glycol,
2,2,3,3,4,4-hexafluoro-1,5-pentanediol,
Hexamethylene glycol,
Decamethylene glycol,
Diethylene glycol,
Ethylene thiodiglycol,
Cis- or trans-hexahydro-p-xylylene glycol,
Cis- or trans-quinitol,
4,4'-bicyclohexyldimethanol,
Bis(4-hydroxymethylcyclohexyl)ethane,
2,2-bis(4-hydroxymethylcyclohexyl)propane,
2,3-bis(4-hydroxymethylcyclohexyl)butane,
2,3-dimethyl-2,3-bis(4-hydroxymethylcyclohexyl)butane,
1,4-bis(4-hydroxymethylcyclohexyl)cyclohexane, and the decahydro-bis(hydroxymethyl)naphthalenes, especially the 2,6-, 2,7-, 1,4-, and 1,5-isomers thereof.

Suitable aralkylene glycols which may be employed include 1,4-bis(3-hydroxypropyl)benzene,
1,4-bis(2-hydroxyethyl)benzene,
2,6-bis(2-hydroxyethyl)naphthalene,
1,4-bis(2-hydroxyethoxy)benzene,
and bis-4-(2-hydroxyethoxyphenyl)sulfone.

Suitable examples of dihydric phenols which can be employed include

Hydroquinone,
Resorcinol,
2,2-bis(4-hydroxyphenyl)propane,
4,4'-dihydroxybiphenyl,
3,3'-dibromo-4,4'-dihydroxybiphenyl,
3,3'-difluoro-4,4'-dihydroxybiphenyl,
Bis(4-hydroxyphenyl)methane,
1,1-bis(4-hydroxyphenyl)ethane,
2,2-bis-(3,5-dichloro-4-hydroxyphenyl)propane,
Bis(4-hydroxyphenyl)ether,
Bis(4-hydroxyphenyl)sulfone,
Bis(4-hydroxyphenyl)ketone,
Bis(4-hydroxyphenyl)sulfoxide,
1,2-bis(4-hydroxyphenoxy)ethane,
and dihydric heterocyclic phenols such as bis(4-hydroxyphenyl)oxindole, phenolphthalein, and phenolphthalimidine.

The divalent Q radical is preferably composed primarily of carbon and hydrogen but may contain other atoms such as halogen atoms, nitrogen atoms, or chalkogen atoms. Thus, the repeating units may contain ether, carbonyl, sulfide, sulfoxide, sulfonyl, amide, or anhydride radicals or groupings. Mixtures of the dihydroxy compounds may be employed.

The polyesters of the invention are prepared by reacting a dihydroxy compound or an ester-forming derivative thereof, as defined and described above, with 1,4-bicyclo[2.2.2]octanedicarboxylic acid or an ester-forming derivative of the acid. By an ester-forming derivative of the acid is meant a derivative of 1,4-bicyclo[2.2.2] octanedicarboxylic acid containing functional groups equivalent to the carboxylic acid groups in their ability to react with hydroxyl groups. Such ester-forming derivatives include its esters, particularly its esters with the lower aliphatic alcohols with phenol, or with the glucol or dihydric phenol from which the polyester is to be formed as well as the carbonyl halides, anhydrides, and salts of the acid.

A convenient method for forming polyesters with glycols involves the use of an alkyl or aryl ester of 1,4-bicyclo[2.2.2]octanedicarboxylic acid with an excess of the glycol from which the polyester is to be formed in an ester interchange reaction. In carrying out the ester interchange reaction, at least one molecular proportion of the glycol per molecule portion of the 1,4-bicyclo-[2.2.2]octanedicarboxylic ester should be used, greater proportions being preferred. It is desirable to employ an ester of the 1,4-bicyclo[2.2.2]octanedicarboxylic acid formed from an alcohol or phenol with a boiling point considerably below that of the glycol to be used so that the former can be removed easily from the reaction zone by distillation. It is preferred to use the methyl or ethyl esters, as these esters are formed from alcohols which, because of their relatively low boiling points, are easily separated by distillation from the glycol to be used to form the desired polyester. Heating should be above the melting point of the reaction mixture and above the boiling point of the alcohol or phenol to be displaced, but not substantially above the boiling point of the glycol, although temperatures as high as 25° C. above the boiling point of the glycol may be used to hasten the completion of the reaction. Heating should be effective under conditions such that the displaced alcohol or phenol can be removed from the reaction zone, usually by means of conventional distillation equipment. The heating is usually at atmospheric pressure, but higher or lower pressures may be used if desired. The ester interchange reaction is advantageously carried out in the presence of ester interchange catalysts such as manganous acetate, calcium acetate, litharge, sodium methoxide, sodium hydrogen hexabutoxytitanate, or other suitable ester interchange catalysts as described in the literature relating to the preparation of polyesters.

Following the ester interchange reaction, heating is continued under reduced pressure until the excess glycol is removed and the polymerization reaction has proceeded to the desired degree. The final stages of polymerization may be carried out with the polymer in the molten state or, if desired, the reaction may be completed by solid phase polymerization. The polymerization reaction may be carried out in the presence of catalysts such as antimony trioxide, litharge, zinc acetate, or other suitable polycondensation catalysts as described in the literature. Sodium hydrogen hexabutoxytitanate and the tetra-alkyl titanates such as tetraisopropyl titanate are examples of catalysts which may be used for both the ester interchange and polymerization steps.

In the preparation of polyesters of 1,4-bicyclo[2.2.2]-octanedicarboxylic acid with dihydric phenols, a very suitable method is to react the acid with the diacetate of the dihydric phenol, or some other lower aliphatic ester of the dihydric phenol, at elevated temperatures in the presence of a catalyst such as sodium acetate. The reaction may be modified in various ways in accordance with known technology for forming polyesters; e.g., if desired, the diacetate of the dihydraulic phenol may be formed in situ by adding the dihydric phenol and acetic anhydride to the starting material reaction mixture. The terminal stage of the reaction may be a solid phase polymerization, as mentioned above. Other esterification methods may be employed to form the polyester of the dihydric phenol, e.g., by reacting a mixture of the dihydric phenol and a diphenyl ester of the 1,4-bicyclo-[2.2.2]octanedicarboxylate in the presence of sodium acetate as a catalyst. Still another method is to add a solution of the acid chloride of 1,4-bicyclo[2.2.2]octanedicarboxylic acid in an organic solvent such as 1,1,2-trichloroethane to a rapidly stirred solution of the dihydric phenol in aqueous sodium hydroxide. Preparation of the polyester from an acid chloride is indeed preferred when one of the reactants contains a group desired in the polyester product but which would be reactive in an esterification of the free acid or in a transesterification reaction; for instance, an ester group or anhydride group.

The dihydroxy component of the polyester may comprise a mixture of a glycol and a dihydric phenol. A convenient method of preparing such copolyesters involves:

(A) Preparation of a homopolyester of the glycol with 1,4-bicyclo[2.2.2]octanedicarboxylic acid, (B) Preparation of a homopolyester of the dihydric phenol with 1,4-bicyclo[2.2.2]octanedicarboxylic acid, and (C) Melt blending of the glycol polyester and the dihydric phenol polyester in the desired proportions under an atmosphere of nitrogen. The blended mixture initially forms a block copolyester, but if the mixture is held an hour or so in the melt, the copolyester becomes random. The catalysts present in the homopolyester also serve as catalysts for the randomization of the copolyester.

As used herein, the term "polyester" is intended to include not only homopolyesters but also copolyesters, terpolyesters, and the like.

While the preferred embodiment of the invention comprises polyesters of 1,4-bicyclo[2.2.2]octanedicarboxylic acid with a dihydroxy compound, it is to be understood that the invention also comprises polyesters in which other acid residues are present. If desired, the 1,4-bicyclo [2.2.2]octanedicarboxylic acid may be employed as a copolymeric acid comprising only a minor amount of the acid component of the polyester; although preferably the acid component comprises at least about 75 mol percent 1,4-bicyclo [2.2.2]octanedicarboxylic acid. By "acid component" of the polyester is meant the sum of all the carboxylic acids which would be formed by the hydrolysis of the carbonyloxy linkages in the polymer chain.

The remainder of the acid component preferably no more than about 25% of the acid component, may be any suitable dicarboxylic acid or hydroxycarboxylic acid. Examples of such compounds include bibenzoic acid, 2,2'- and 3,3'-dimethyl-4,4'-bibenzoic acid,
2,2'-dibromo-4,4'-bibenzoic acid,
Bis(4-carboxyphenyl)methane,
1,1- and 1,2-bis(4-carboxyphenyl)ethane,
2,2-bis(4-carboxyphenyl)propane,
1,2-bis(4-carboxyphenoxy)ethane,
Bis-4-carboxyphenyl ether,
Bis-4-carboxyphenyl sulfide,
Bis-4-carboxyphenyl ketone,
Bis-4-carboxyphenyl sulfoxide,
Bis-4-carboxyphenyl sulfone,
2,8-dibenzofurandicarboxylic acid,
Terephthalic acid,
Methylterephthalic acid,
2,5- or 2,6-dimethylterephthalic acid,
Chloroterephthalic acid,
2,5-dichloroterephthalic acid,
Fluoroterephthalic acid,
Isophthalic acid,
5-t-butylisophthalic acid,
the naphthalene dicarboxylic acids and especially the 1,4-, 1,5-, 2,6-, and 2,7-isomers,
Phenylenediacetic acids,
4-carboxyphenoxyacetic acid,
m- and p-terphenyl-4,4''-dicarboxylic acid,
Dodecahydrodibenzoic acid,
Hexahydroterephthalic acid, 4,4''-stilbenedicarboxylic acid,
4-(2-hydroxyethyl)benzoic acid, and
4-(2-hydroxyethoxy)benzoic acid.

Hydrocarbon dicarboxylic acids or hydroxycarboxylic acids are normally preferred as copolymeric acids; however, halogen, chalkogen, or other modifiers which are inert in the preparation of the polyester may be present. A minor amount of a dihydroxy compound or an acid component carrying a metallic sulfonate salt, carboxylate salt, phosphonate salt, or the like may also be present.

Within the broad range of useful polymers, which includes polyesters melting as low as approximately 100° C. and as high as about 325° C., it is generally considered that those polyesters melting below about 200° C. are suitable for molding compositions while the higher melting polyesters have a similar utility but are also especially advantageous for the extrusion of fibers and films. Polyesters of at least about 0.2 intrinsic viscosity are considered to be of sufficiently high molecular weight for utility in forming molded articles as well as films. For use in extruding fibers and filaments, polycondensation is usually continued until the intrinsic viscosity is at least about 0.3.

The following examples will serve to describe the preparation of typical polyesters and copolyesters of 1,4-bicyclo[2.2.2]octanedicarboxylic acid. The examples are not intended to be limitative.

As used herein, the "polymer-melt temperature," abbreviated "PMT," is defined as that temperature where a polymer sample becomes molten and leaves a trail when moved across a hot metal surface with moderate pressure. Practical considerations in PMT determinations are discussed by Sorenson and Campbell in "Preparative Methods of Polymer Chemistry," Interscience Publishers, Inc., New York, pages 49-50 (1961).

The term "intrinsic viscosity," as used herein, is defined as the limit of the fraction $\ln(r)/c$, as $c$ approaches 0, where $(r)$ is the relative viscosity, and $c$ is the concentration in grams per 100 ml. of solution. The relative viscosity $(r)$ is the ratio of the viscosity of a solution of the polymer in a mixture of 1 part trifluoroacetic acid and 3 parts methylene chloride (by volume) to the viscosity of the trifluoroacetic acid/methylene chloride mixture, per se, measured in the same units at 25° C. Intrinsic viscosity is a measure of the degree of polymerization.

*Example 1.—Poly(1,3-phenylene 1,4-bicyclo[2.2.2] octanedicarboxylate)*

A charge consisting of 8.00 g. (0.0404 mol) of 1,4-bicyclo[2.2.2]octanedicarboxylic acid, 7.83 g. (0.0404 mol) of resorcinol diacetate, 0.01 g. (0.0001 mol) of sodium acetate catalyst, and 10 ml. of a eutectic mixture of diphenyl and diphenyl oxide ("Dowtherm A") is placed in a reaction flask fitted with a stirrer, distilling head, heating bath, and a capillary tube for nitrogen flow. The apparatus is heated to 230° C. to melt the contents. Evolution of acetic acid begins almost immediately after the ingredients become molten. The temperature is gradually increased to 285° C. over a period of 8 hours while the reaction is continued under atmospheric pressure, after which the temperature is increased to 300° C. and the pressure is reduced to 1.2 mm. of mercury while polycondensation is continued for an additional 4 hours. The resulting product is cooled and then crystallized by treating it with methylene chloride and drying it. This product is identified as poly-(1,3-phenylene 1,4-bicyclo[2.2.2]octanedicarboxylate). The PMT is 300° C. and the intrinsic viscosity is 0.36. Films are readily melt pressed from the polymer. The films have a high degree of stability to light, as shown by the absence of any color break after 48 hours of continuous exposure to light generated by a xenon arc source (employing a Xenotest W Original Hanau instrument, manufactured by Quarzlampen Gesellschaft m.b.H., Hanau, and distributed by G. F. Bush Associates of Princeton, N.J.). In this instrument, one hour of exposure is equivalent to 2.5 hours of mid-day Florida sunlight.

As a comparison, the experiment is repeated following the general procedure outlined above but substituting 0.0404 mol of isophthalic acid for the 1,4-bicyclo[2.2.2]octanedicarboxylic acid. The product, poly(1,3-phenylene isophthalate), has a PMT of 265° C. and an intrinsic viscosity of 0.45 A. A film melt-pressed from this polymer, when exposed continuously for 48 hours to a xenon arc source as above, exhibits considerable discoloration in contrast to the freedom from discoloration observed with the sample of poly(1,3-phenylene 1,4-bicyclo[2.2.2]octanedicarboxylate).

*Example 2.—Poly(decahydronaphthalene-2,6-dimethylene 1,4-bicyclo[2.2.2]octanedicarboxylate)*

Into a small polymer tube is placed 10 g. (0.044 mol) of dimethyl 1,4-bicyclo[2.2.2]octanedicarboxylate, 14.8 g. (0.075 mol) of decahydro-2,6-bis(hydroxymethyl)naphthalene, and, as a catalyst, 5 drops of a solution of 16 g. of sodium hexabutoxytitanate, $NaHTi(OBu)_6$, in 200 cc. of n-butanol. The ingredients are melted and a capillary for nitrogen flow is inserted into the polymer tube. Ester exchange is carried out for two hours at 220–230° C., after which the temperature is raised to 280° C. and vacuum is applied gradually until the pressure is reduced to 0.5 mm. of mercury. After 4 hours at this temperature, a white solid having an intrinsic viscosity of about 0.5 and a PMT of 250° C. is produced.

The polymeric material prepared as described above is powdered and then heated for 5 hours under a stream of nitrogen at 250° C. The polymer produced by this solid phase polymerization reaction is identified as poly-(decahydronaphthalene - 2,6 - dimethylene 1,4 - bicyclo-[2.2.2]octanedicarboxylate), the intrinsic viscosity of the polymer is 0.6 and the PMT is 257° C. Fibers are formed by melt spinning. Films melt pressed from the polymer are tough and flexible and have a high degree of stability to light, as shown by the absence of any color break after 120 hours of continuous exposure to light generated by a xenon arc source.

The experiment described above is repeated, substituting 0.044 mol of bis(4-carbomethoxyphenyl) sulfone for the dimethyl 1,4-bicyclo[2.2.2]octanedicarboxylate. The resulting polymer, poly(decahydronaphthalene-2,6-dimethylene 4,4'-sulfonyldibenzoate), has a PMT of 220° C. and an intrinsic viscosity of 0.5. Films melt pressed from this polymer, when exposed continuously to light generated by a xenon arc source, develop a considerable amount of discoloration after only 24 hours of exposure.

*Example 3.—Poly(cis/trans-hexahydro-p-xylylene 1,4-bicyclo[2.2.2]octanedicarboxylate)*

A polymer tube is charged with 11.3 g. (0.05 mol) of dimethyl 1,4-bicyclo[2.2.2]octanedicarboxylate, 21.6 g. (0.15 mol) of hexahydro-p-xylylene glycol (approximately 60% cis, 40% trans), and 0.05 g. of $$NaHTi(OBu)_6$$

in 0.5 ml. of n-butanol. The mixture is heated to 175° C., after which the temperature is slowly increased to 300° C. over a period of 2 hours with evolution of methanol. While the temperature is maintained at 300° C., the pressure is reduced to 0.8 mm. of mercury and polycondensation is continued for an additional two hours. The resulting polymeric material is cooled, finely ground, and then heated again in the solid state at 240° C. and 1.2 mm. of mercury for 20 hours. The polymer produced by this solid phase polymerization reaction is identified as poly(cis/trans-hexahydro-p-xylylene 1,4-bicyclo-[2.2.2]octanedicarboxylate), the intrinsic viscosity of the polymer is 0.8 and the PMT is 275° C.

A molten sample of the polymer is extruded at 310° C. to form a filament, using conventional techniques. The filament is oriented by drawing it around a 110° C. pin at a draw ratio of 3. The drawn filament is heat-treated in an oven at 160° C. for 3 minutes. The heat-treated filament has a tenacity of 1.0 g.p.d., a break elongation of 10%, a modulus of 30 g.p.d., and a boil-off shrinkage of 9%. It is insoluble in perchloroethylene and has a high degree of stability to light, as shown by the absence of any color break after 100 hours of continuous exposure to light generated by a xenon arc source. The filament dyes readily with monochlorinated 4,5-diamino-1,8-dihydroxyanthraquinone dye in the presence of o-phenylphenol as a carrier to give a medium shade of blue. The filament is found to have excellent ability to recover from low levels of extension. Values for "tensile strain recovery" (TSR) and "modified tensile strain recovery" (MTSR) are 66% and 84%, respectively.

The TSR of filament is determined by mounting a 10-inch length of the filament on a tensile tester with recording chart (commercially available from the Instron Enginering Corporation, Quincy, Mass.) and also equipped with a circulating water bath which can be raised and lowered. The water bath, maintained at 40° C., is raised to immerse the filament. After the filament has been immersed for 2 minutes without tension it is stretched, in the water bath, at an elongation rate of 1 inch per minute. Upon reaching the desired total elongation, the sample is held at constant length for an additional 2 minutes and the water bath is removed. The load on the filament is then reduced to a value of 0.042 g.p.d. and the filament is allowed to react. Percent recovery is calculated from the formula:

$$\frac{\text{units of retraction}}{\text{units of elongation}} \times 100\%$$

This procedure is carried out for elongations of 0.5, 1, 2, and 3%, and a graph is prepared by plotting the percent recovery against total elongation in the range 0–3%. TSR values are average percent recovery values from the range 0–3% elongation which may be determined from the graph by usual graphical averaging procedures. Filaments having TSR values of 60% are considered to have good tensile recovery.

The MTSR of a yarn sample is determined by repeating the procedure described above for TSR determination, except that (1) the yarn is initially dried on the tensile tester in a slack condition for 4 minutes at 80° C. and then cooled for one minute before being immersed in the water bath and stretched and (2) after the yarn has been stretched and the water bath removed, the load on the yarn is reduced to a value of 0.042 g.p.d. and the yarn is allowed to retract while again being dried at a temperature of 80° C. for 4 minutes; the heater is then removed and the yarn cooled for an additional 1 minute before the final length is measured. Calculation of the MTSR value is then carried out using the same formula and graphical procedures employed for TSR as described above. In rating yarns for tensile recovery using the MTSR parameter, a value of 70% is considered good.

*Example 4.—Poly(trans-hexahydro-p-xylylene 1,4-bicyclo[2.2.2]octanedicarboxylate)*

Into a small polymer tube is placed 13.6 g. (0.06 mol) of dimethyl 1,4-bicyclo[2.2.2]octanedicarboxylate, 17.6 g. (0.122 mol) of trans-hexahydro-p-xylylene glycol and, as a catalyst, 15 drops of a 10% solution of NaHTi(OBu)$_6$ in n-butanol. Ester exchange is carried out for two hours at 220–230° C. under an atmosphere of nitrogen, after which melt polycondensation is carried out for 90 minutes at 300–310° C. and a pressure of 0.5 mm. of mercury. The polymeric material so produced is solidified, powdered, and further polymerized in the solid phase at 240° C. under an atmosphere of nitrogen at a pressure of about 1 mm. of mercury for 5 hours. The product, identified as poly(trans-hexahydro-p-xylylene 1,4-bicyclo [2.2.2]octanedicarboxylate), has an intrinsic viscosity of 0.65 and PMT is 250° C.

A molten sample of the polymer is extruded at 325° C. to form a filament, which is subsequently oriented by drawing it 2.7×, employing a 110° C. draw pin. The drawn filament is heat treated by boiling it in water for 15 minutes, heating it in an oven at 160° C. for 3 minutes, and finally immersing it in boiling water again for 15 minutes. The heat-treated filament has a tenacity of 0.5 g.p.d., an elongation of 3%, an initial modulus of 24 g.p.d., a TSR of 64%, and an MTSR of 72%. An X-ray diffraction pattern reveals that it is highly crystalline.

*Example 5.—Polyethylene 1,4-bicyclo[2.2.2.]octanedicarboxylate and terephthalate copolyester thereof*

A polymer tube is charged with 14g. (0.062 mol) of dimethyl 1,4-bicyclo[2.2.2]octanedicarboxylate and 13 ml. of ethylene glycol containg a catalytic amount of manganous acetate and antimony trioxide. Ester exchange is carried out at 200–240° C. under an atmosphere of nitrogen for 2.5 hours, after which melt polycondensation is carried out for 2.5 hours at 285° C. under an atmosphere of xylene at 0.07 mm. The polymeric product, idenified as poly(ethylene 1,4-bicyclo[2.2.2]octanedicarboxylate), has an intrinsic viscosity of 0.42 and a PMT of 170° C. Orientable fibers are formed from the polymer melt.

The procedure is repeated, using a mixed ester component comprising 14.55 g. (0.075 mol) dimethyl terephthalate and 5.7 g. (0.025 mol) dimethyl 1,4-bicyclo-[2.2.2]octanedicarboxylate and 12.2 ml. of the catalyst-containing glycol. The polymeric product, poly(ethylene terephthalate/1,4 - bicyclo[2.2.2]octanedicarboxylate) (75%/25%), has an intrinsic viscosity of 0.36 and a PMT of 185° C. The molten copolyester can be extruded to form flexible films and orientable filaments.

*Example 6.—Poly(1,4-bicyclo[2.2.2]octanedimethylene 1,4-bicyclo[2.2.2]octanedicarboxylate)*

Fourteen g. (0.082 mol) of 1,4-bicyclo[2.2.2.]octanedimethanol and 8.46 g. (0.037 mol) of dimethyl 1,4-bicyclo-[2.2.2]octanedicarboxylate are reacted in the presence of 10 drops of an 8% solution of NaHTi(OBu)$_6$ in n-butanol. Ester exchange is carried out under nitrogen for 2.5 hours at 220–230° C. with evolution of methanol, after which polycondensation is carried out under an atmosphere of xylene at 285° C. and 0.07 mm. of mercury for 2.5 hours. The product has a PMT of 293° C. and an intrinsic viscosity of 0.17. Subsequently, solid phase polymerization is carried out under a stream of nitrogen at a pressure of 0.5 mm. of mercury for 4 hours at 240° C. The resulting polymer has a PMT of 315° C. and is identified as poly-(1,4-bicyclo[2.2.2]octanedimethylene 1,4-bicyclo [2.2.2]-octanedicarboxylate).

*Example 7.—Poly(isopropylidene-4,4'-diphenylene 1,4-bicyclo[2.2.2]octanedicarboxylate)*

A charge consisting of 12.5 g. (0.04 mol) of diphenylolpropane diacetate, 8.1 g. (0.041 mol) of 1,4-bicyclo-[2.2.2.]octanedicarboxylic acid, and 0.05 g. (0.0006 mol) of sodium acetate catalyst is placed in a polymer tube fitted with a nitrogen inlet. During a period of 1.5 hours the reaction mixture is heated from 220° to 250° C. at atmospheric pressure with a constant slow stream of nitrogen, acetic acid being evolved. The stream of nitrogen is then changed to a stream of xylene vapor, the pressure is reduced to 0.05 mm. of mercury, and the temperature is increased to 285° C. After 2 hours of heating under these conditions, the reaction mixture is cooled. A crystalline polymer having an intrinsic viscosity of 0.3 is obtained. The polymer is infusible at temperatures up to 400° C.

Since many different embodiments of the invention may be made without departing from the spirit and scope thereof, it is to be understood that the invention is not

I claim:
1. fiber-forming linear polyester consisting essentially of recurring ester units of the structural formula,

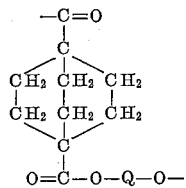

wherein Q is a divalent radical of the group consisting of 1,3-phenylene, hexahydro-p-xylylene, ethylene and isopropylidene-4,4'-diphenylene.
2. Films of the linear polyester defined in claim 1.
3. Fibers of the linear polyester defined in claim 1.
4. Poly(1,3-phenylene 1,4-bicyclo[2.2.2]octanedicarboxylate).
5. Poly(hexahydro-p-xylylene 1,4-bicyclo[2.2.2]octanedicarboxylate).
6. Poly(ethylene 1,4 - bicyclo[2.2.2]octanedicarboxylate).
7. Poly(isopropylidene - 4,4' - diphenylene 1,4-bicyclo[2.2.2]octanedicarboxylate).

References Cited by the Examiner
UNITED STATES PATENTS

| | | | |
|---|---|---|---|
| 3,007,900 | 11/1961 | Lytton et al. | 260—75 |
| 3,081,334 | 3/1963 | Kauer | 260—468 |
| 3,110,547 | 11/1963 | Emmert | 260—75 |

OTHER REFERENCES

Roberts et al., J. Am. Chem. Soc., 75 (1953), p. 637.

WILLIAM H. SHORT, *Primary Examiner.*
LOUISE P. QUAST, *Examiner.*